RELATIONSHIP OF $H_2SO_4$ : DIOL MOLAR RATIO TO SULFURIC ACID STRENGTH
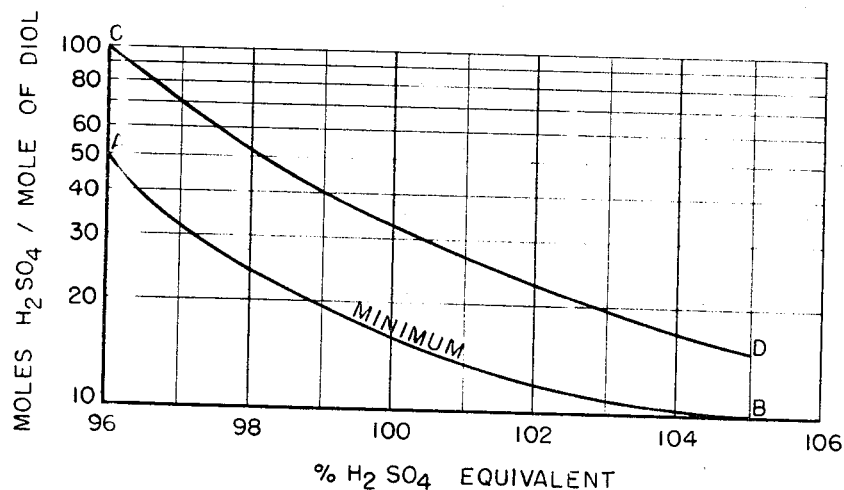

United States Patent Office 3,523,136
Patented Aug. 4, 1970

3,523,136
PREPARATION OF DIAMIDOADAMANTANE
COMPOUNDS
Abraham Schneider, Overbrook Hills, Pa., and Robert E.
Moore, Wilmington, Del., assignors to Sun Oil Company, Philadelphia, Pa., a corporation of New Jersey
Continuation-in-part of application Ser. No. 450,016,
Apr. 22, 1965. This application Apr. 16, 1968, Ser.
No. 725,573
Int. Cl. C07c *103/08*
U.S. Cl. 260—558
32 Claims

ABSTRACT OF THE DISCLOSURE

Dihydroxy derivatives of adamantane or alkyladamantanes are converted in high yield to 1,3-diamidoadamantanes by reaction in a relatively high proportion of strong sulfuric acid of 96–105% $H_2SO_4$ equivalent with cyano compounds of the group embracing HCN and RCN where R is a $C_1$–$C_{17}$ hydrocarbyl radical which is alkyl, aryl or aralkyl.

CROSS REFERENCE TO RELATED APPLICATION

This application is a continuation-in-part of copending application Ser. No. 450,016, filed Apr. 22, 1965, now abandoned.

This invention relates to 1,3-diamidoadamantanes as new compounds and to their preparation from dihydroxyadamantanes and dihydroxyalkyladamantanes by reaction thereof with cyano compounds in the presence of strong sulfuric acid.

The adamantane nucleus has ten carbon atoms, four of which are bridgehead carbons that are equivalent to each other, as can be seen from the following typographical representation:

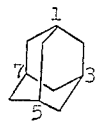

As shown, the bridgehead carbon atoms customarily are designated by the numerals 1, 3, 5 and 7 respectively.

The 1,3-diamido compounds prepared in accordance with the invention contain an adamantane group consisting of an adamantane nucleus or an alkyladamantane moiety in which either one or two alkyl groups are attached to the adamantane nucleus either at bridgehead or nonbridgehead positions. The total number of carbon atoms in the alkyl substituent group or groups is in the range of 1–10 inclusive. The diamido compounds correspond to the formula

in which A is a group having an adamantane nucleus and 0–2 alkyl substituents having not more than 10 total carbon atoms, and R is either hydrogen or a $C_1$–$C_{17}$ hydrocarbyl radical of the class consisting of alkyl, aryl (including alkaryl) and aralkyl. In these compounds each amido group is attached to a bridgehead carbon of the adamantane nucleus; hence the compounds are all 1,3-derivatives of the adamantane hydrocarbon to which they correspond.

The foregoing class of compounds which can be prepared according to the invention includes novel compounds in which the adamantane nucleus has substituents at each bridgehead carbon atom and hence contains no tertiary hydrogen atoms. The substituents at the 1- and 3-positions are the amido groups and those at the 5- and 7-positions are alkyl groups having a total of from 2 to 10 carbon atoms. Such alkyl groups can be methyl, ethyl, propyl, butyl or the like. The compounds within this subclass are 1,3-diamido-5,7-dialkyladamantanes in which the amido groups correspond to

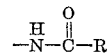

as defined above. Preferred compounds within this subclass are those in which the two alkyl groups each are methyl and each diamido group is formamido, acetamido or benzamido (the R groups corresponding, respectively, to hydrogen, methyl or phenyl).

The compounds of the present invention are prepared from adamantane diols or alkyladamantane diols in which the hydroxy groups originally can be attached to the adamantane nucleus at either bridgehead or non-bridgehead positions or both. Mixtures of bridgehead and nonbridgehead diols can be used if desired. These hydroxy compounds are reacted either with HCN or with RCN, wherein R is a $C_1$–$C_{17}$ hydrocarbyl radical as above specified, in the presence of strong sulfuric acid. In order for this reaction to proceed properly it is necessary that both the strength of the acid and the amount used be as hereinafter specified in conjunction with the accompanying drawing. After the hydroxy and cyano compounds have reacted, the resulting reaction mixture is admixed with water and the desired diamido compound is thereupon formed by a hydrolysis or solvolysis reaction. The product which is recovered from the reaction mixture is the 1,3-diamido derivative of adamantane or alkyladamantane even in cases where one or both of the hydroxy groups in the original diol was or were attached to the nucleus at a nonbridgehead position. This result is obtained due to the fact that the strong sulfuric acid used to effect the conversion will rapidly isomerize any non-bridgehead hydroxyl group to a bridgehead position of the adamantane nucleus. Hence either or both hydroxyls in the starting adamantane compound can be attached to a nonbridgehead carbon and the reaction product will be precisely the same (i.e., the 1,3-diamido derivative) as when a 1,3-dihydroxyadamantane compound is used. Alkyl groups on the adamantane nucleus are not affected during the reaction and remain in their original position, whether it be bridgehead or nonbridgehead.

By way of example of the invention, 1,3-dihydroxy-3,5-dimethyladamantane is reacted with acetonitrile in the presence of fuming sulfuric acid (e.g., 102% $H_2SO_4$ equivalent) and the reaction product is then diluted with water. The product is 1,3-diacetamido-3,5-dimethyladamantane obtained in the form of white crystals. The reactions which occur in forming this product can be illustrated as follows:

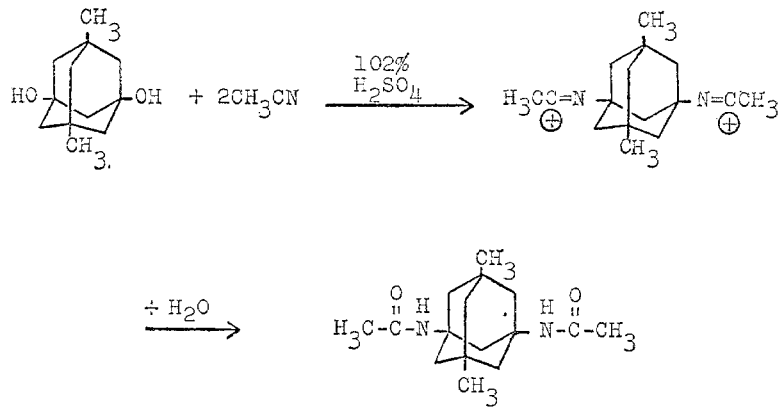

As indicated the acetonitrile reacts at each site of the hydroxyl groups by what appears to be a carbonium ion mechanism and apparently produces at each site an intermediate

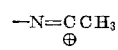

carbonium ion group. In this initial reaction the hydroxyl groups become bound or taken up by the strong sulfuric acid in some manner. In order to obtain the desired product it is essential to dilute the acid solution with a large amount of water in order to allow hydrolysis or solvolysis to proceed to form the two amido groups. When the reaction mixture is diluted with sufficient water, the 1,3-diacetamido-5,7-dimethyladamantane precipitates as white crystals and can be separated by filtration.

As another specific example, 1,3 - dihydroxy - 5,7-dimethyladamantane is reacted in the presence of fuming sulfuric acid with hydrogen cyanide generated in situ by addition of NaCN to a mixture of the diol and fuming acid. The mixture is then diluted with water and 1,3-diformamido - 5,7 - dimethyladamantane is produced. In this case the diamido product is soluble in the aqueous sulfuric acid and does not precipitate. It can be extracted therefrom by a suitable solvent such as benzene or ether.

The following is a specific example illustrating the use of a mixture of alkyladamantane diols having, respectively, one and two nonbridgehead hydroxyl groups. Specifically, a mixture of 0.5 mole of 1,4-dihydroxy-3-ethyl-7-n-propyladamantane and 0.5 mole of 2,4-dihydroxy-1-n-propyl - 5 - ethyladamantane is reacted at 5° C. in 50 moles of 100% $H_2SO_4$ with 2.0 moles of 4-phenylbenzonitrile. The product is 1,3-bis(4-phenylbenzamido)-5-n-propyl-7-ethyladamantane, and the reaction producing it can be depicted by the following equation:

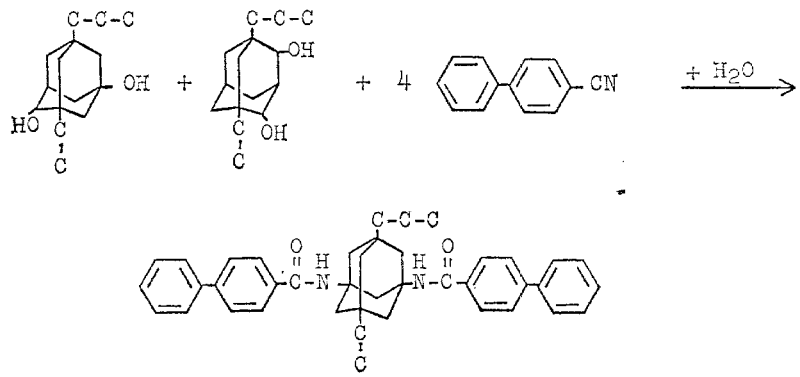

As shown by the equation, even though the starting diol contains one or two nonbridgehead hydroxyl groups, the amido groups resulting from the reaction are both located at bridgehead positions. Thus the product is the same as would have been obtained by starting with a dibridgehead diol.

The dihydroxy reactant in the present process can be a diol of adamantane itself or of any alkyadamantane having attached to the adamantane nucleus 1–2 alkyl groups containing 1–10 total carbon atoms. The two hydroxyl groups can be attached to bridgehead and/or nonbridgehead carbon atoms of the nucleus. Examples of such reactants are the diols of the following hydrocarbons (the —OH groups being on the nucleus): adamantane; 1-methyl or 2-methyladamantane; 1-ethyl or 2-ethyladamantane; 1,2-dimethyl or 1,3-dimethyladamantane; 1-methyl-3-ethyladamantane; diethyladamantanes; 1-n-propyl or 1-isopropyladamantane; 1-n-butyladamantane; 1,3-di-n-pentyladamantane; 1-methyl-3-heptyladamantane; and 1-n-decyladamantane. Diols such as these and others as herein specified for practicing the invention are derivable from the corresponding hydrocarbons as discussed below.

The preparation of alkyladamantanes from which the diols can be made can be effected by known procedures such as those described, for example, in the following: U.S. Pat. 3,128,316; U.S. Pat. 3,275,700; U.S. Pat. 3,336,405; U.S. Pat. 3,336,406; U.S. Pat. 3,356,751; Schneider U.S. application Ser. No. 613,443, filed Feb. 2, 1967, now U.S. Pat. No. 3,383,424; Spengler et al., Erdöl und Kohle-Erdgas-Petrochemie, 15, 702–707 (1962); and Hoek et al., 85, (1966) Recueil 1045–1053.

Conversion of the alkyladamantanes to bridgehead diols can be achieved by catalytically oxidizing the hydrocarbon with air in the manner described in Schneider U.S. Pat. 3,356,741, or by reacting the hydrocarbon with chromic acid in the manner taught in Moore United States application Ser. No. 664,311, filed Aug. 30, 1967, now U.S. Pat. No. 3,383,424. In the air oxidation procedure described in Pat. No. 3,356,741, part of the oxidation product is the 1,3-dihydroxy derivative of the alkyladamantane feed. Another part is composed of ketohydroxy derivatives thereof in which the keto group is located on the nucleus necessarily at a nonbridgehead carbon and the hydroxy group is located at both bridgehead and nonbridgehead carbons. These ketohydroxy products can be hydrogenated by procedures disclosed in the patent to convert the keto to a second hydroxyl group. The resulting hydrogenated product thus would constitute nonbridgehead diols some of which would have one nonbridgehead hydroxy group and others two such nonbridgehead groups. These can be used individually, in admixture with each other, or in admixture also with the 1,3-diols formed by the airoxidation step, as feed for the present process. Regardless of which of these are used as feed, conversion thereof by the present invention will result in the same product, namely, the 1,3-diamido derivative.

Dihydroxyalkyladamantanes having at least one nonbridgehead hydroxyl group can also be obtained by a Grignard synthesis from the ketohydroxy products of the air oxidation process discussed above. An analogous Grignard synthesis has ben described by Schelyer et al., 83 JACS 186, wherein adamantanone was reacted with methyl iodide and magnesium to yield 2-methyl-2-adamantanol. By such procedure not only is the keto group converted to —OH but a new alkyl group is attached to the adamantane nucleus at the same nonbridgehead position to which the —OH is affixed. By way of example, ketohydroxy products formed by air oxidation of 1-ethyladamantane can be reacted with twice their molar proportion of ethyl magnesium iodide, followed by hydrolysis in the presence of $NH_4Cl$, to give diethyladamantane diols in which the new ethyl group and one of the hydroxyl groups are attached to the same nonbridgehead carbon atom of the nucleus. Conversion of this product in accordance with the present invention will result in the 1,3 diamide diethyladamantane derivatives.

The cyano reactant for the present process can be hydrogen cyanide or any alkyl, aryl (including alkaryl) or aralkyl mononitrile having 2–18 total carbon atoms. In other words, representing the cyano reactant as RCN, R can be hydrogen, or any hydrocarbyl group selected from $C_1$–$C_{17}$ alkyl groups, $C_6$–$C_{17}$ aryl groups and $C_7$–$C_{17}$ aralkyl groups. Any such cyano compound can be used in the process and the R group in each amido moiety

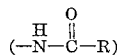

of the diamido product will be the same as the R in the starting RCN reactant.

The preferred cyano reactants are acetonitrile, benzonitrile and HCN. When hydrogen cyanide is used as the cyano compound, it can be generated in situ by adding NaCN or KCN to the mixture of dihydroxyadamantane compound and sulfuric acid.

Examples of other suitable RCN reactants where R is alkyl of the $C_1$–$C_{17}$ range are the following: propanenitrile; butanenitrile; 2-methylbutanenitrile; octanenitrile; dodecanenitrile; and octadecanitrile (i.e., stearonitrile). The following are other examples of RCN reactants wherein R is aryl of the $C_6$–$C_{17}$ range: o-tolunitrile; m-ethylbenzonitrile; p-isopropylbenzonitrile; p-n-hexylbenzonitrile; p-n-undecylbenzonitrile; 1-naphthonitrile; 6-methyl-2-naphthonitrile; 7-hexyl-2-naphthonitrile; 3-phenanthronitrile; 3-ethyl-9-phenanthronitrile; and the like. The following are a few examples of cyano reactants wherein the R group is aralkyl of the $C_7$–$C_{17}$ range: benzylcyanide; benzylacetonitrile; 2-phenylbutanenitrile; 2-m-tolyldecanenitrile; 2-phenylbutanenitrile; 4-biphenylnitrile; 2-m-tolyldecanenitrile; 4-biphenylacetonitrile; 2-(6-methylanthracyl)acetonitrile; and 4-(2-benzonaphthyl)butanenitrile. Any of the foregoing or any analogous cyano compounds of the ranges specified can be used in practicing the invention, and the R group in the resulting diamido product will be the same as the R group in the cyano reactant.

In effecting the reaction of the dihydroxyadamantane compound with the cyano compound it is highly important that the sulfuric acid have a high enough acid strength and be used in large enough amount, as otherwise reaction may not take place or may take place at only one of the hydroxyl sites of the adamantane compound. In other words use of sulfuric acid of insufficient strength or in insufficient amount will result in failure to produce the desired diamido compound and may produce no product or only the monoamido derivative will be obtained. In all cases the strength of the starting acid should be at least about 96% $H_2SO_4$ equivalent by weight, and it is distinctly preferable to employ fuming sulfuric acid having $H_2SO_4$ equivalent in the range of 100–105% by weight. Maximum yields of the desired product can more readily be obtained when fuming sulfuric acid is employed.

The minimum proportion of sulfuric acid to the adamantane diol compound that can be used for the present purpose varies with the strength of the sulfuric acid employed. This is shown in the accompanying drawing in which line AB shows the relationship between the minimum permissible molar ratio of acid to diol and the strength of the sulfuric acid. Such ratio is expressed as moles of $H_2SO_4$ equivalent per mole of adamantane diol, while the strength of the acid is expressed as percent $H_2SO_4$ equivalent by weight. Line CD in the drawing indicates the $H_2SO_4$:diol molar ratios above which it is preferable to practice the invention. As indicated by lines AB and CD, fuming sulfuric acid, which is $H_2SO_4$ having sulfur trioxide dissolved therein, is used in strengths ranging up to 105% $H_2SO_4$ equivalent. As can be seen from the drawing, when concentrated sulfuric acid (96%) is used to practice the invention, the moles of $H_2SO_4$ equivalent used per mole of adamantane diol compound should exceed 50:1 (line AB). More preferably this ratio should exceed 100:1 (line CD) to insure the best yield of the desired diamido compound. When the acid strength is 102% $H_2SO_4$, the minimum $H_2SO_4$:diol ratio is about 12:1 (line AB) and preferably such ratio is at least 22:1 (line CD). As indicated in the drawing, still lower $H_2SO_4$:diol ratios are permissible when the acid strength is increased to 105% $H_2SO_4$, although ratios of at least 15:1 are always preferred.

The amount of the cyano compound used should be such that at least one molecule of it is available to react at the site of each hydroxyl group or in other words that the molar ratio of the cyano compound to the adamantane diol compound is at least 2:1. An excess of the cyano compound over this ratio is not detrimental and a ratio of say 3:1 typically can be used.

In carrying out the present process the adamantane diol compound preferably is first dissolved in the strong sulfuric acid in a proportion such that the molar ratio of $H_2SO_4$ to the diol is at least that required by line AB and preferably is well above such ratio. This can be done merely by adding the diol to the sulfuric acid at room temperature and stirring for several minutes. As the diol goes into solution some release of heat occurs but the exotherm is relatively mild. After the diol has been dissolved, the cyano compound is added to the mixture while agitating the same and reaction takes place as indicated by the initial step of the first equation given above. This reaction can be carried out at any temperature between the freezing point of the reaction mixture to its boiling point, e.g., from —20° C. to 80° C., and usually will be conducted at about room temperature. When an aromatic nitrile is used that has a ring not attached to the cyano group, as in the case of naphthonitriles, phenanthronitriles or biphenylnitriles, it is generally desirable to carry out the reaction at a relatively low temperature (e.g., 0–10° C.) to minimize the possibility of side reactions. When NaCN or KCN is used to generate HCN in situ as the cyano reactant, the temperature generally should be maintained substantially below 26° C. to prevent the HCN from boiling off or else the reaction should be carried out under pressure. With either HCN or RCN as the cyano reactant the reaction generally will be complete within thirty minutes reaction time.

After the first phase of the overall reaction has been completed, the mixture is admixed with a relatively large volume of water to effect hydrolysis or solvolysis and produce the desired diamido product. Preferably this is done by pouring the strongly acidic mixture over cracked ice to effect dilution while simultaneously preventing the temperature from rising an inordinate amount. Enough water (ice) should be used to adequately decrease the strength of the sulfuric acid so that hydrolysis or solvolysis will occur and the diamido product will precipitate except in the case of the diformamido products which, as previously pointed out, tend to be soluble in the diluted acid. Generally the strength of the diluted acid should be less than 50% $H_2SO_4$ and more preferably less than 20%. After this final reaction has been effected, the precipitated diamido product can be separated from the mixture by filtration or in the case of diformamido products separation can be effected by extraction with a suitable hydrocarbon or ether solvent.

The following examples are specific illustrations of the invention:

EXAMPLE I

This example shows the preparation of 1,3-diacetamido-5,7-dimethyladamantane. To 50 ml. of fuming sulfuric acid having a strength of 102% $H_2SO_4$ equivalent by weight and cooled to about 10° C., 5.0 g. (0.0255 mole) of 1,3-dihydroxy-5,7-dimethyladamantane in powder form were added and the mixture was stirred to dissolve the diol in the fuming acid. Complete dissolution took place in about 5 minutes. The molar ratio of $H_2SO_4$ equivalent to diol was about 38:1. The mixture was maintained at about 10° C. and was stirred while 4.1 g. (0.10 mole) of acetonitrile were added slowly thereto over a period of 30 minutes, following which the mixture was stirred for 45 minutes additionally to insure completion of the reaction. The molar ratio of acetonitrile to the diol was approximately 4:1. The reaction mixture was then poured slowly over cracked ice (about 0.5 kilogram), whereupon melting of the ice and the resulting dilution of the acid solution caused hydrolysis to take place to form the diacetamido product in the form of a finely divided precipitate. The mixture was filtered and the residue was washed with acetone and dried. A white crystalline product was obtained in amount of 6.75 g. This product was determined by vapor phase chromatography, infrared and nuclear magnetic residence analyses to be substantially pure 1,3 - diacetamido-5,7-dimethyladamantane. It had a melting point of 315° C. and the yield thereof was 95% based on theory. With reference to the accompanying drawing, this example shows that the use of an $H_2SO_4$:diol mole ratio of 38:1 for fuming acid having 102% $H_2SO_4$ equivalent (i.e., above line CD) gives an excellent yield of the desired diamido product.

EXAMPLE II

This example shows the preparation of 1,3-diformamido-5,7-dimethyladamantane and was carried out in generally the same way as the preceding example except that powdered NaCN was added to the acid-diol solution instead of acetonitrile. The NaCN was added over a period of 2 hours in amount of 7.5 g. and it reacted with the sulfuric acid to form HCN which in turn reacted with the diol in the manner herein described. The molar ratio of HCN generated to the dimethyladamantane diol was about 6:1. More heat was released during this reaction than in the case of acetonitrile and the temperature of the mixture tended to rise. In this reaction $Na_2SO_4$ is formed and it tends to cause the mixture to be gelatinous if a low temperature is maintained. Hence after the addition of all the NaCN, the temperature was allowed to rise to room temperature level and the mixture was stirred for one-half hour. Upon dilution as in Example I the diformamido product was formed but it remained in solution. It was extracted therefrom by means of a 50:50 mixture of ether and benzene, the resulting solution was water washed and then dried via $Na_2SO_4$ and the solvent was evaporated. The resulting product had a melting point of 185° C. and was identified by VPC, IR and NMR as 1,3-diformamido-5,7-dimethyladamantane. The yield based on theory was about 85%.

EXAMPLE III

When Example II is repeated except that HCN itself is added to the acid-diol mixture and the reaction temperature is maintained at about 10° C. until the reaction is complete, 1,3-diformamido-5,7-dimethyladamantane is obtained in a yield of about 95% based on theory.

EXAMPLE IV

The diacetamido compound of Example I was again prepared but concentrated sulfuric acid (96% $H_2SO_4$) was used in large proportion instead of fuming acid. Specifically 0.47 g. (.0024 mole) of 1,3-dihydroxy-3,5-dimethyladamantane was suspended in 2.5 ml. (0.048 mole) of acetonitrile, the mixture was stirred and 10 ml. of concentrated sulfuric acid were added all at once. The molar ratio of $H_2SO_4$ to diol was about 68:1, which corresponds to a point in the accompanying drawing about half way between lines AB and CD. The molar ratio of acetonitrile to diol was 20:1. A highly exothermic reaction occurred. Thereafter the mixture was diluted with a large volume of water, the sulfuric acid was neutralized by the addition of aqueous NaOH and a white precipitate was obtained. The product was impure 1,3-diacetamido-5,7-dimethyladamantane and melted at 305–308° C. The product can be purified by washing out impurities with acetone or by recrystallization from dimethylformamide.

EXAMPLE V

Another run was made substantially like Example IV using concentrated sulfuric acid except that the molar ratio of $H_2SO_4$ to diol was reduced to 34:1 (below line AB of the drawing) and the acetonitrile:diol molar ratio was 40:1. Under these conditions no diacetamido product was obtained. This shows that for 96% $H_2SO_4$ and $H_2SO_4$:diol molar ratio of 34:1 is insufficient for effecting reaction at both hydroxyl sites of the dihydroxyadamantane compound.

EXAMPLE VI

This example shows the preparation of 1,3-dibenzamido-5,7-dimethyladamantane by a procedure analogous to that of Example I but substituting benzonitrile for acetonitrile. 3 g. (0.0153 mole) of the dimethyladamantane diol was dissolved in 30 ml. of fuming sulfuric acid (102% $H_2SO_4$) and 5 g. (0.0459 mole) of benzonitrile were added dropwise while stirring the chilled mixture. The molar ratio of $H_2SO_4$ equivalent to diol was 38:1 and that of benzonitrile to diol was about 3:1. The mixture was poured over cracked ice and insoluble dibenzamido product formed. The mixture was filtered, and the residue was washed with methanol and acetone and then was dried. 5.8 g. of white crystalline product which was substantially pure 1,3-dibenzamido-5,7-dimethyladamantane were obtained. The yield based on theory was 94% and the product had a melting point of 250–251° C.

When adamantane diol or diols of other alkyladamantanes as herein specified are used in place of 1,3-hydroxy-5,7-dimethyladamantane, similar results are obtained as in the preceding examples. Likewise when cyano compounds as above specified other than HCN, acetonitrile or benzonitrile are used in practicing the invention, substantially analogous results are obtained.

The diamido adamantane compounds prepared according to the present invention can be converted to diaminoadamantanes by acid or base hydrolysis, which compounds can be polymerized with diacids. Hence the products of the present invention have utility in the manufacture of polyamides which can be used in the manufacture of fibers, films and molded articles.

The diamido adamantane compounds of the present invention are also useful for incorporation into polyolefins such as polyethylene or polypropylene, to function as antistatic agents for fibers or molded articles or as slip agents when the polymer is extruded as film. The use of slip agents in polymer extrusion processes is advantageous in that it facilitates the extrusion operation and gives a smoother extruded product.

Diamido products of the invention also exhibit various pesticidal activities and hence find utility in the agricultural area. For instance, 1,3-diacetamido-5,7-dimethyladamantane prepared as described in Example I has exhibited significant activity in soil fungicidal tests against the fungus *Pythium aphanidermatum*.

Heretofore in the prior art as disclosed by Stetter and Wulff, Chem. Ber., vol. 93, page 1366 (1960), 1,3-diacetamidoadamantane has been prepared from a mixture of 1,3-dibromoadamantane, silver sulfate and acetonitrile in the presence of concentrated sulfuric acid. This diacetamido product, which contains no alkyl groups, has two unsubstituted bridgehead carbon atoms in the adamantance nucleus and hence contains two tertiary hydrogen atoms per molecule. These tertiary hydrogen positions are relatively reactive sites. In contrast the 1,3-diamido-5,7-dialkyladamantanes of the present invention has no unsubstituted bridgehead carbon atoms and hence no tertiary hydrogen atoms. This is advantageous for utilizing such diamido products to make polymers, since the polymers made from the diamine derived from 1,3-diamido-5,7-dialkyladamantanes are more stable than the corresponding polymers would be if the two alkyl groups were not present in the monomer. In other words the presence of alkyl groups at the 5- and 7-positions of the adamantane nucleus results in higher stability with respect to oxidation resistance, thermal degradation and the like.

The present method of making 1,3-diamidoadamantane compounds is distinctly advantageous over the method of making 1,3-diacetamidoadamantane as disclosed in the aforesaid reference in that the present method does not require the use of an expensive silver salt as the former method does. It is further advantageous in that higher yields of the diamido product can readily be obtained. For example, a yield of 70% of the theoretical was obtained according to the aforesaid prior art reference whereas the present method will readily give yields of the order of 95% on theory, especially when fuming sulfuric acid is used to effect the reaction.

The invention claimed is:
1. Method of preparing a 1,3-diamidoadamantane compound corresponding to the formula

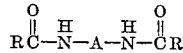

wherein A is a group having an adamantane nucleus and 0–2 alkyl substituents having not more than 10 total carbon atoms, R is a radical selected from the group consisting of hydrogen and hydrocarbyl radicals selected from $C_1$–$C_{17}$ alkyl radicals, $C_6$–$C_{17}$ aryl radicals and $C_7$–$C_{17}$ aralkyl radicals, and each amido group is attached to the adamantane nucleus at a bridgehead position, which comprises:
 (a) dissolving a dihydroxyadamantane compound, selected from the group consisting of dihydroxyadamantane and dihydroxyalkyladamantanes having attached to the adamantane nucleus 1–2 alkyl groups containing 1–10 total carbon atoms, in sulfuric acid having a strength in the range of 96–105% $H_2SO_4$ equivalent by weight, the molar ratio of $H_2SO_4$ to said dihydroxyadamantane compound being above that shown by line AB of the accompanying drawing;
 (b) reacting the mixture at a temperature in the range of −20° to 80° C. with a cyano compound selected from the group consisting of HCN and RCN wherein R is a $C_1$–$C_{17}$ hydrocarbyl radical as above specified, the molar ratio of the cyano compound to said dihydroxyadamantane compound being at least 2:1;
 (c) mixing the reaction mixture with water;
 (d) and separating said 1,3-diamidoadamantane compound from the resulting mixture.

2. Method according to claim 1 wherein the sulfuric acid is fuming sulfuric acid.

3. Method according to claim 1 wherein said cyano compound is RCN wherein R is an alkyl group.

4. Method according to claim 3 wherein said cyano compound is acetonitrile.

5. Method according to claim 3 wherein the sulfuric acid is fuming sulfuric acid.

6. Method according to claim 1 wherein said cyano compound is benzonitrile.

7. Method according to claim 1 wherein said cyano compound is HCN.

8. Method according to claim 1 wherein said ratio of $H_2SO_4$ to dihydroxyadamantane compound is above that shown by line CD of the accompanying drawing.

9. Method of preparing a 1,3-diacetamido alkyladamantane which comprises:
 (a) dissolving a dihydroxyalkyladamantane having attached to the adamantane nucleus 1–2 alkyl groups containing 1–10 total carbon atoms in fuming sulfuric acid having a strength in the range of 100–105% $H_2SO_4$ equivalent by weight, the molar ratio of $H_2SO_4$ to said dihydroxyalkyladamantane being above that shown by line AB of the accompanying drawing;
 (b) reacting the mixture at a temperature in the range of −20° to 80° C. with acetonitrile used in amount of at least 2 moles per mole of dihydroxyalkyladamantane;
 (c) mixing the reaction mixture with water;
 (d) and separating 1,3-diacetamido alkyladamantane from the resulting mixture.

10. Method according to claim 9 wherein said dihydroxyalkyladamantane is 1,3-dihydroxydimethyladamantane.

11. Method according to claim 9 wherein said ratio of $H_2SO_4$ to dihydroxyalkyladamantane is above that shown by line CD of the accompanying drawing.

12. Method of preparing a 1,3-diformamido alkyladamantane which comprises:
 (a) dissolving a dihydroxyalkyladamantane having attached to the adamantane nucleus 1–2 alkyl groups containing 1–10 total carbon atoms in fuming sulfuric acid having a strength in the range of 100–105% $H_2SO_4$ equivalent by weight, the molar ratio of $H_2SO_4$ to said dihydroxyalkyladamantane being above that shown by line AB of the accompanying drawing;
 (b) reacting the mixture at a temperature in the range of −20° to 80° C. with HCN used in amount of at least 2 moles per mole of dihydroxyalkyladamantane;
 (c) mixing the reaction mixture with water;
 (d) and separating 1,3-diformamido alkyladamantane from the resulting mixture.

13. Method according to claim 12 wherein said dihydroxyalkyladamantane is 1,3-dihydroxydimethyladamantane.

14. Method according to claim 12 wherein said ratio of $H_2SO_4$ to dihydroxyalkyladamantane is above that shown by line CD of the accompanying drawing.

15. A 1,3-diamido-5,7-dialkyladamantane compound in which the two alkyl groups have 2–10 total carbon atoms and each diamido group corresponds to

wherein R is a radical selected from the group consisting of hydrogen and hydrocarbyl radicals selected from $C_1$–$C_{17}$ alkyl radicals, $C_6$–$C_{17}$ aryl radicals and $C_7$–$C_{17}$ aralkyl radicals.

16. A compound according to claim 15 wherein each of the alkyl groups attached to the adamantane nucleus is methyl.

17. The compound of claim 16 which is 1,3-diacetamido-5,7-dimethyladamantane.

18. The compound of claim 16 which is 1,3-diformamido-5,7-dimethyladamantane.

19. The compound of claim 16 which is 1,3-dibenzamido-5,7-dimethyladamantane.

20. A compound according to claim 15 wherein R is hydrogen.

21. A compound according to claim 15 wherein R is methyl.

22. A compound according to claim 15 wherein R is phenyl.

23. A compound according to claim 15 wherein R is an alkyl radical of the $C_1$–$C_{17}$ range.

24. A compound according to claim 15 wherein R is an aryl radical of the $C_6$–$C_{17}$ range.

25. A compound according to claim 15 wherein R is an aralkyl radical of the $C_7$–$C_{17}$ range.

26. Method according to claim 1 wherein the dihydroxyadamantane compound has at least one hydroxy group attached to the adamantane nucleus at a bridgehead position.

27. Method according to claim 26 wherein said dihydroxyadamantane compound also has 1–2 alkyl radicals attached to the nucleus.

28. Method according to claim 27 wherein said cyano compound is acetonitrile, benzonitrile or HCN.

29. Method according to claim 1 wherein the dihydroxyadamantane compound has both hydroxy groups attached to the adamantane nucleus at bridgehead positions.

30. Method according to claim 29 wherein said dihydroxyadamantane compound also has 1–2 alkyl radicals attached to the nucleus.

31. Method according to claim 30 wherein said cyano compound is acetonitrile, benzonitrile or HCN.

32. Method according to claim 1 wherein a 1,3-dihydroxyadamantane compound is used and is reacted in step (b) with acetonitrile, benzonitrile or HCN.

References Cited

Stetter et al., Chem. Ber., vol. 93, p. 1966 (1960).

JOHN D. RANDOLPH, Primary Examiner

H. I. MOATZ, Assistant Examiner